United States Patent
Zhu et al.

(10) Patent No.: US 12,208,832 B2
(45) Date of Patent: Jan. 28, 2025

(54) FOLDABLE BACKREST STRUCTURE AND CHILD CARRIER THEREWITH

(71) Applicant: Wonderland Switzerland AG, Steinhausen (CH)

(72) Inventors: Wanquan Zhu, Guangdong (CN); Hongbin Xu, Guangdong (CN); Zhengwen Guo, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/793,055

(22) PCT Filed: Jan. 15, 2021

(86) PCT No.: PCT/EP2021/050780
§ 371 (c)(1),
(2) Date: Jul. 15, 2022

(87) PCT Pub. No.: WO2021/144407
PCT Pub. Date: Jul. 22, 2021

(65) Prior Publication Data
US 2023/0060708 A1    Mar. 2, 2023

(30) Foreign Application Priority Data

Jan. 17, 2020   (CN) .......................... 202010057416.2

(51) Int. Cl.
*B62B 7/06* (2006.01)
*B62B 9/10* (2006.01)

(52) U.S. Cl.
CPC ................ *B62B 7/06* (2013.01); *B62B 9/104* (2013.01); *B62B 2205/20* (2013.01)

(58) Field of Classification Search
CPC .. B62B 7/06; B62B 7/064; B62B 7/08; B62B 7/145; B62B 7/142; B62B 7/062;
(Continued)

(56) References Cited

U.S. PATENT DOCUMENTS 9,908,551 B2 *   3/2018   Ransil .................... B62B 9/102
10,479,389 B2 * 11/2019   Zhong .................... F16B 12/06
(Continued)

FOREIGN PATENT DOCUMENTS

CN        207955753 U     10/2018
DE   102017205702 A1 *  10/2017   ............... B62B 7/06
(Continued)

OTHER PUBLICATIONS

"International Search Report" mailed on Mar. 23, 2021 for International application No. PCT/EP2021/050780, International filing date:Jan. 15, 2021.

*Primary Examiner* — Steve Clemmons
(74) *Attorney, Agent, or Firm* — Winston Hsu

(57) ABSTRACT

A foldable backrest structure (50) adapted for a frame (40) of a child carrier (100), includes a backrest (30), a releasing mechanism (20) and a trigger (10). The backrest (30) is pivoted to the frame (40). The releasing mechanism (20) is disposed between the backrest (30) and the frame (40). The releasing mechanism (20) includes a first abutting component (22). The trigger (10) is disposed on the frame (40) and for slidably abutting against the first abutting component (22) to drive the releasing mechanism (20) to release the backrest (30), so as to allow the backrest (30) to be folded together with the frame (40) when the frame (40) is being folded. The foldable backrest structure (50) of the present invention has advantages of simple structure, easy operation and low manufacturing cost. Besides, the present invention further discloses a child carrier (100) including the aforementioned foldable backrest structure (50).

13 Claims, 8 Drawing Sheets

(58) Field of Classification Search
CPC ........... B62B 7/105; B62B 9/104; B62B 9/00; B62B 9/102; B62B 2205/20
See application file for complete search history.

(56) References Cited

U.S. PATENT DOCUMENTS

2013/0147161 A1    6/2013    Chen
2017/0297599 A1    10/2017    Zhong
2019/0322304 A1*    10/2019    Zhong ....................... B62B 7/08

FOREIGN PATENT DOCUMENTS

| | | | | |
|---|---|---|---|---|
| EP | 1 591 338 A2 | | 11/2005 | |
| EP | 1 591 338 A3 | | 12/2007 | |
| GB | 2537014 A | * | 10/2016 | ............. B62B 7/008 |
| GB | 2544377 A | | 5/2017 | |
| TW | 201429773 A | | 8/2014 | |
| WO | 2007/053021 A1 | | 5/2007 | |
| WO | 2019/202116 A2 | | 10/2019 | |

* cited by examiner

FOLDABLE BACKREST STRUCTURE AND CHILD CARRIER THEREWITH

CROSS REFERENCE TO RELATED APPLICATIONS

This is a 371 U.S. National Phase of International Application No. PCT/EP2021/050780, filed on Jan. 15, 2021, which claims the benefit of CN patent application No. 202010057416.2, and the contents of this application are incorporated herein by reference.

FIELD OF THE INVENTION

The present invention relates to a foldable backrest structure and a child carrier according to the pre-characterizing clauses of claims 1 and 13.

BACKGROUND OF THE INVENTION

When a caregiver travels with a child, a child carrier, such as a stroller, can reduce a burden of the caregiver. Therefore, the child carrier becomes more and more popular. The child carrier is usually configured to be foldable to reduce an occupied space for easy storage or transportation. However, the conventional child carrier requires a complicated two-stage folding operation, which includes operations of manually unlocking and folding a backrest and then folding a frame, so as to fold the conventional child carrier.

Therefore, there is a need to provide a foldable backrest structure and a child carrier therewith which can be folded easily.

SUMMARY OF THE INVENTION

This is mind, the present invention aims at providing a foldable backrest structure and a child carrier therewith.

This is achieved by a foldable backrest structure and a child carrier according to claims 1 and 13. The dependent claims pertain to corresponding further developments and improvements.

As will be seen more clearly from the detail description following below, the claimed foldable backrest structure adapted for a frame of a child carrier. The foldable backrest structure includes a backrest, a releasing mechanism and a trigger. The backrest is pivoted to the frame. The releasing mechanism is disposed between the backrest and the frame. The releasing mechanism includes a first abutting component. The trigger is disposed on the frame and for slidably abutting against the first abutting component to drive the releasing mechanism to release the backrest, so as to allow the backrest to be folded together with the frame when the frame is being folded.

According to an embodiment of the present invention, a triggering slanted surface is disposed on the trigger. An abutting slanted surface is disposed on the first abutting component, and the triggering slanted surface is for slidably abutting against the abutting slanted surface.

According to an embodiment of the present invention, a first connecting base is disposed on an end portion of the backrest. The releasing mechanism further includes a second connecting base and a second abutting component. The second connecting base is connected to the frame. The first connecting base is rotatably connected to the second connecting base. A positioning component is disposed on the first connecting base. At least one positioning hole is disposed on the second connecting base and for allowing an insertion of the positioning component. The first abutting component and the second abutting component are slidably disposed on the second connecting base. An end of the first abutting component slidably abuts against the second abutting component, and the trigger drives the first abutting component to push the second abutting component to disengage the positioning component from the at least one positioning hole when the trigger slidably abuts against the first abutting component.

According to an embodiment of the present invention, the first abutting component includes a first movable portion and an abutting portion. The first movable portion is for pushing the second abutting component, and the abutting portion protrudes out of the second connecting base and is for slidably abutting against the trigger.

According to an embodiment of the present invention, the second abutting component includes a second movable portion and a first abutting pin. The second movable portion is slidably disposed on the second connecting base, and the first abutting pin is disposed on the second movable portion and is for being slidably inserted into the at least one positioning hole.

According to an embodiment of the present invention, the at least one positioning hole includes a plurality of positioning holes. The second abutting component further includes at least one second abutting pin pivoted to the second movable portion, and the first abutting pin and the at least one second abutting pin are for being inserted into at least two corresponding positioning holes of the plurality of positioning holes respectively.

According to an embodiment of the present invention, a guiding slot is disposed on the second movable portion. A guiding component is disposed on the second connecting base. The guiding component slidably passes through the guiding slot, and the second movable portion is driven by a sliding cooperation of the guiding component and the guiding slot to slide relative to the second connecting base along a longitudinal direction of the guiding slot.

According to an embodiment of the present invention, a first slanted surface is disposed on the first abutting component. A second slanted surface is disposed on the second abutting component, and the first slanted surface is for slidably cooperating with the second slanted surface.

According to an embodiment of the present invention, a recovering component is disposed between the second abutting component and the second connecting base and for driving the second abutting component to recover.

According to an embodiment of the present invention, the recovering component is a compression spring.

According to an embodiment of the present invention, a resilient component is disposed between the backrest and the frame and for driving the backrest to pivot to a folded position.

According to an embodiment of the present invention, an accommodating slot is disposed on the first connecting base. An engaging portion is disposed on the second connecting base. A first end of the resilient component is fixed on the engaging portion, and a second end of the resilient component abuts against a wall of the accommodating slot.

According to an embodiment of the present invention, the resilient component is a spring structure.

Furthermore, the claimed child carrier includes a frame and the foldable backrest structure of any one of the aforementioned embodiments connected to the frame.

In contrast to the prior art, the foldable backrest structure of the present application utilizes the releasing mechanism disposed between the backrest and the frame and the trigger disposed on the frame to release the backrest by a cooperation of the releasing mechanism and the trigger when the frame is being folded, so that a user can fold the backrest together with the frame. Therefore, the present invention has an advantage of easy operation. Besides, the present invention further has advantages of simple structure and low manufacturing cost.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

In the following, the invention is further illustrated by way of example, taking reference to the accompanying drawings. Thereof

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is coupled to a second device, that connection may be through a direct mechanical connection, or through an indirect mechanical connection via other devices and connections.

Figure 1:
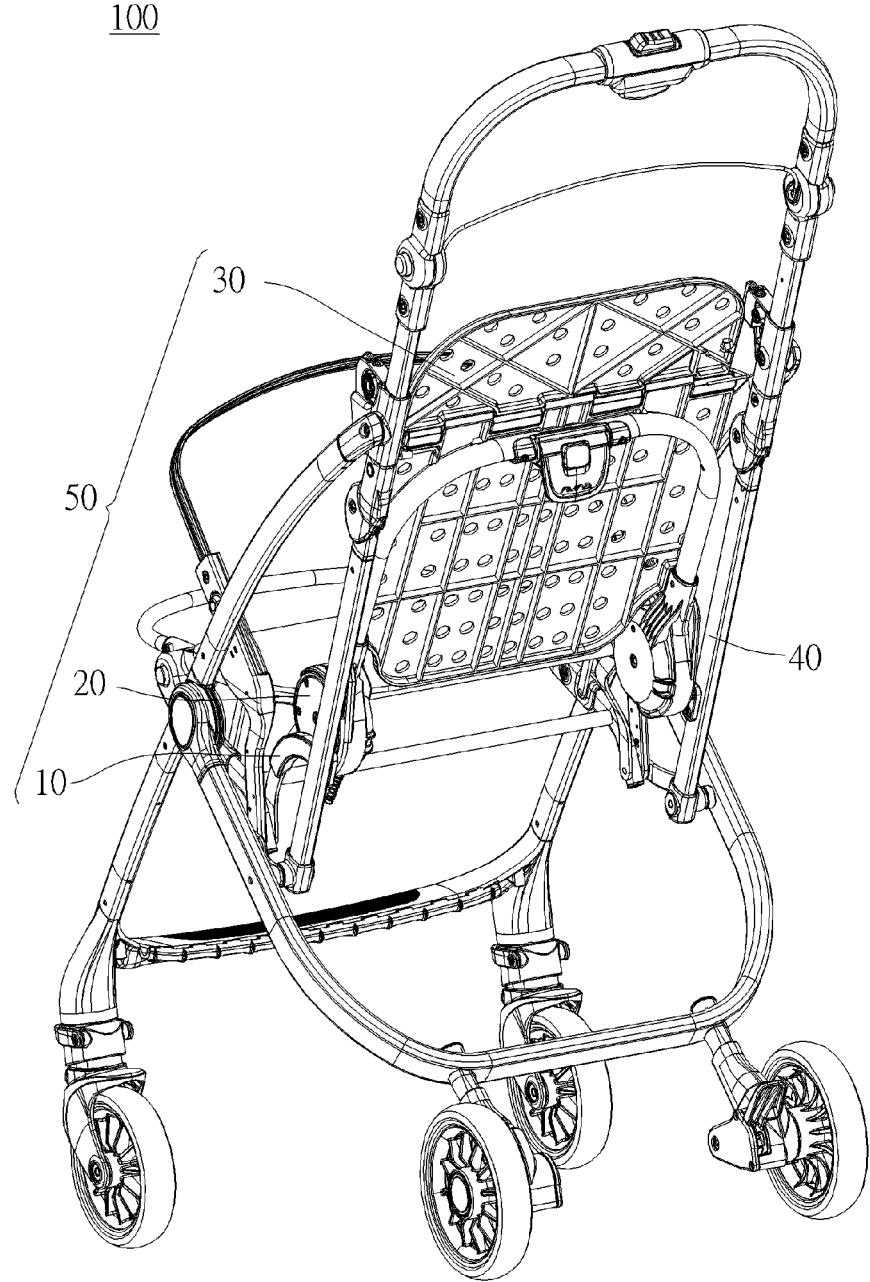
FIG. 1 and FIG. 2 are schematic diagrams of a child carrier at different views according to an embodiment of the present invention.
Figure 2:
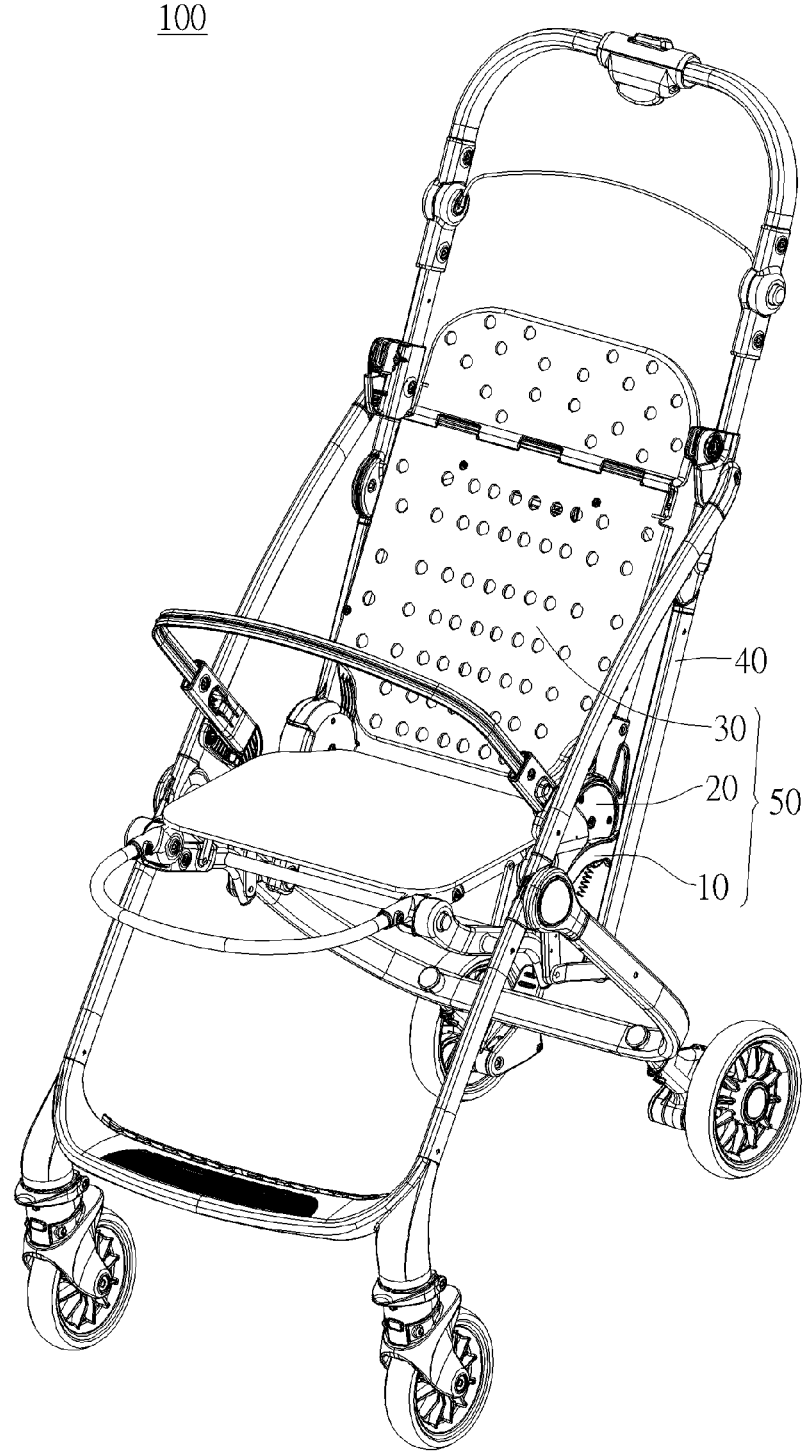
Figure 3:
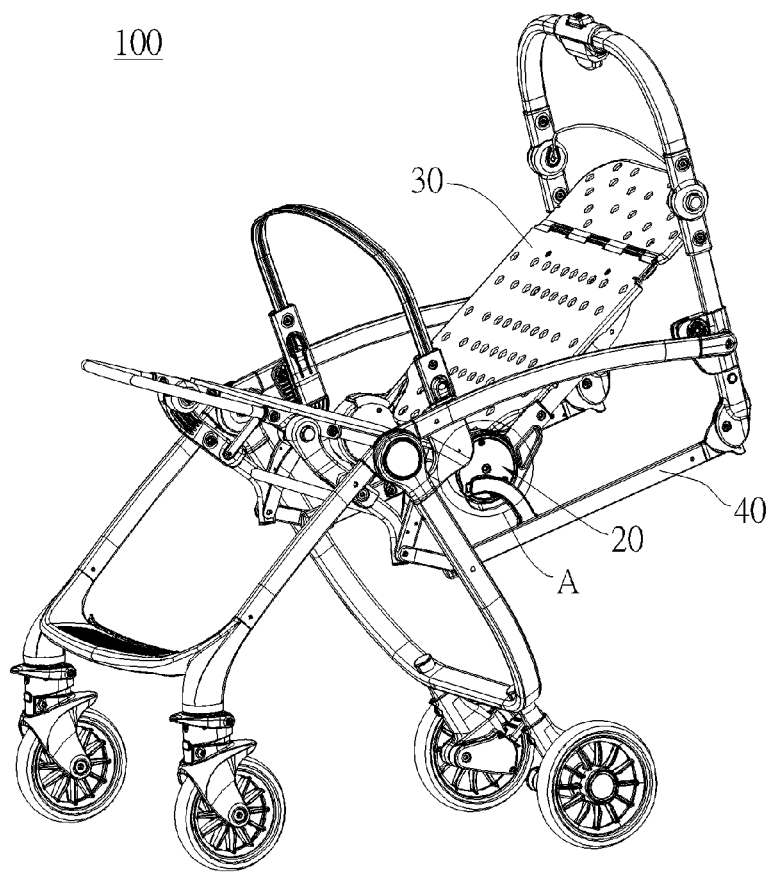
FIG. 3 is a schematic diagram of the child carrier in another state according to the embodiment of the present invention.
Figure 4:
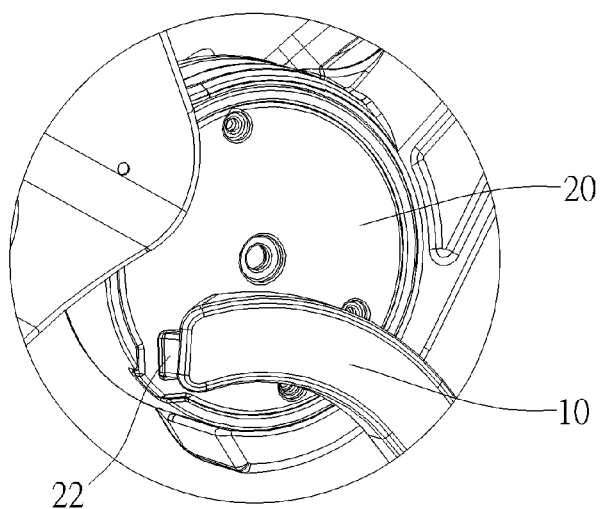
FIG. 4 is an enlarged diagram of an A portion of the child carrier shown in FIG. 3 according to the embodiment of the present invention.

Please refer to FIG. 1 to FIG. 4. FIG. 1 and FIG. 2 are schematic diagrams of a child carrier 100 at different views according to an embodiment of the present invention. FIG. 3 is a schematic diagram of the child carrier 100 in another state according to the embodiment of the present invention. FIG. 4 is an enlarged diagram of an A portion of the child carrier 100 shown in FIG. 3 according to the embodiment of the present invention. As shown in FIG. 1 to FIG. 4, in this embodiment, the child carrier 100 can be a child stroller. However, the present invention is not limited to this embodiment. For example, in another embodiment, the child carrier can be a child basket. The child carrier 100 includes a frame 40 and a foldable backrest structure 50. The foldable backrest structure 50 is connected to the frame 40 and includes a trigger 10, a releasing mechanism 20 and a backrest 30. The backrest 30 is pivoted to the frame 40. The releasing mechanism 20 is disposed between the backrest 30 and the frame 40. The trigger 10 is disposed on the frame 40 and for slidably abutting against the releasing mechanism 20 when the frame 40 is being folded. Specifically, the releasing mechanism 20 includes a first abutting component 22. When the frame 40 is being folded, the trigger 10 can slidably abut against the first abutting component 22 to drive the releasing mechanism 20 for releasing the backrest 30 to allow the backrest 30 to fold relative to the frame 40. After the backrest 30 is released, a user can fold the backrest 30 together with the frame 40.

Figure 5:
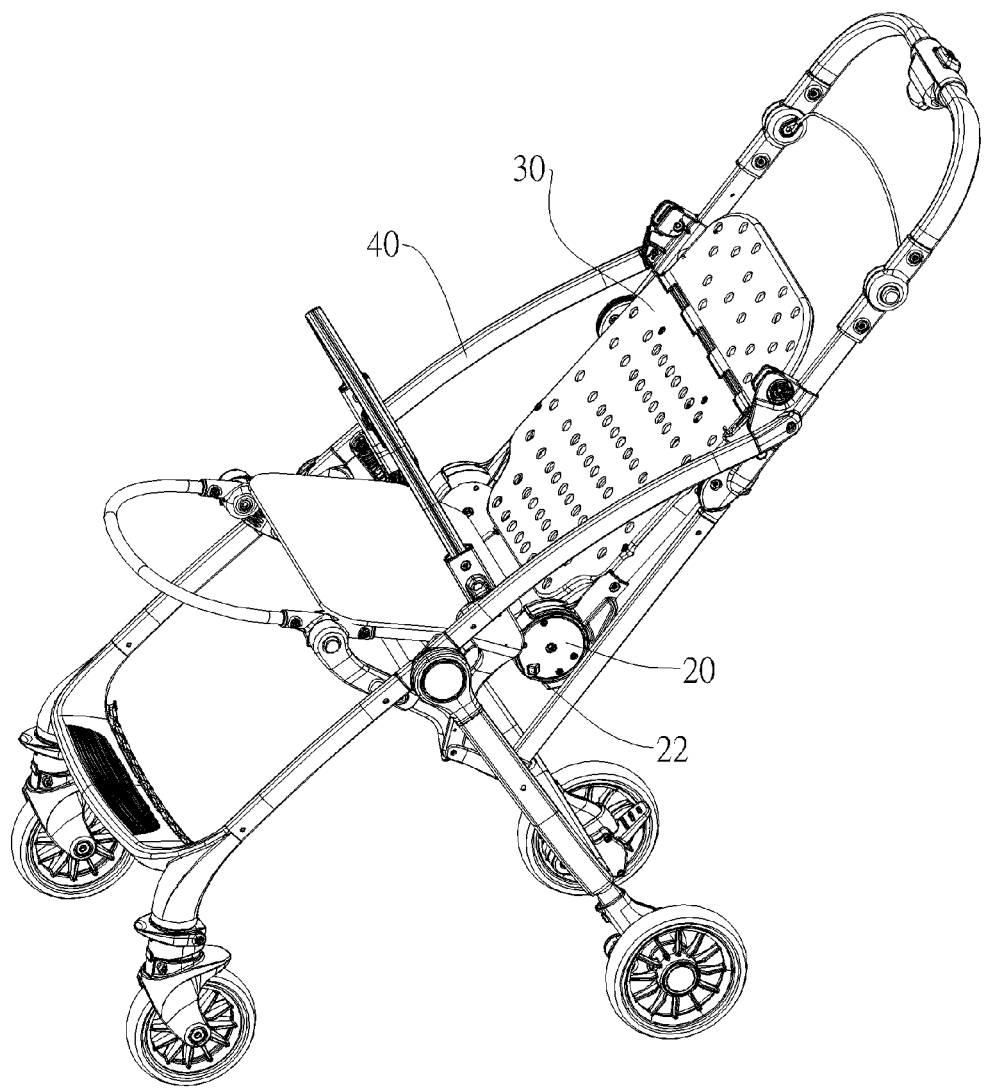
FIG. 5 and FIG. 6 are partial diagrams of the child carrier at different states according to the embodiment of the present invention.
Figure 6:
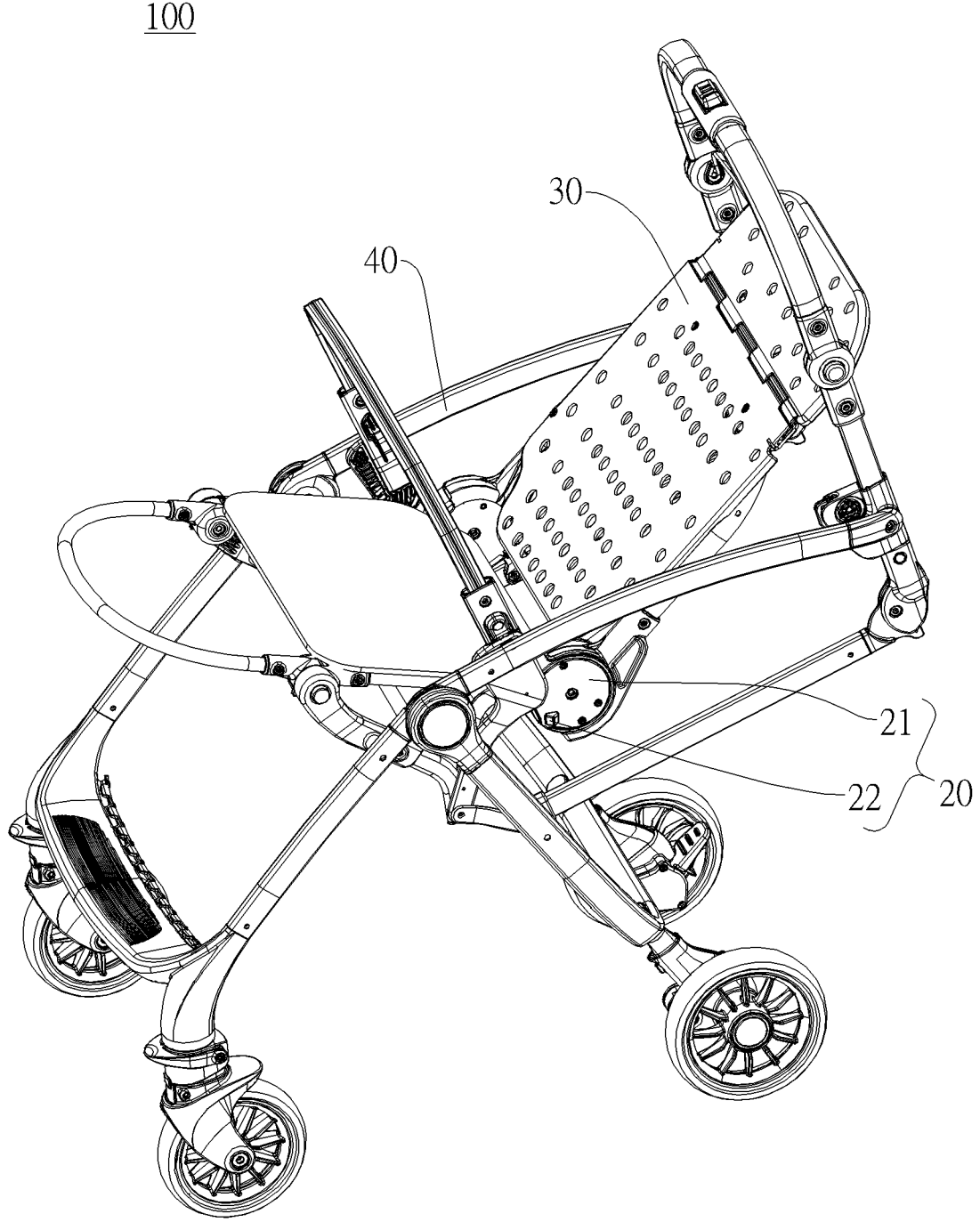
Figure 7:
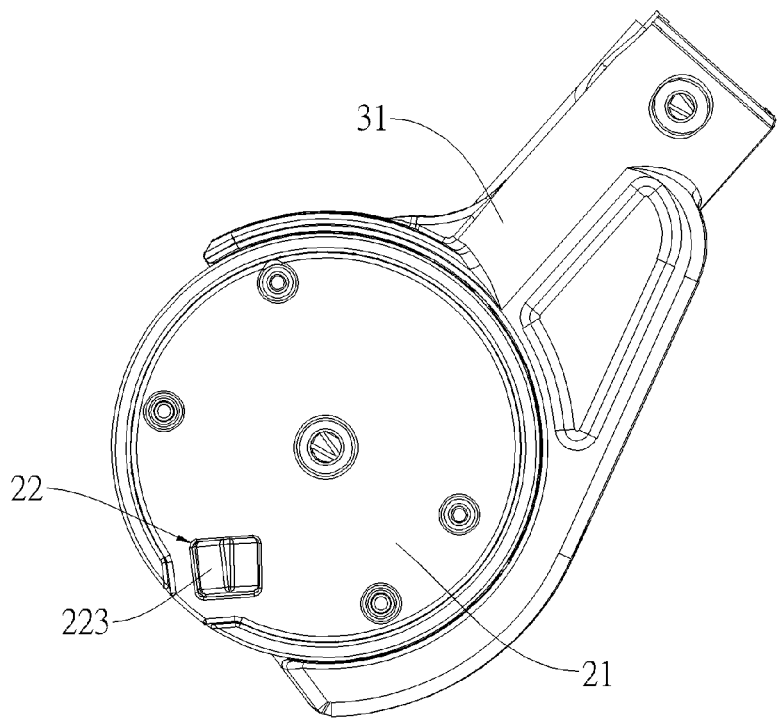
FIG. 7 is another partial diagram of the child carrier according to the embodiment of the present invention.
Figure 8:
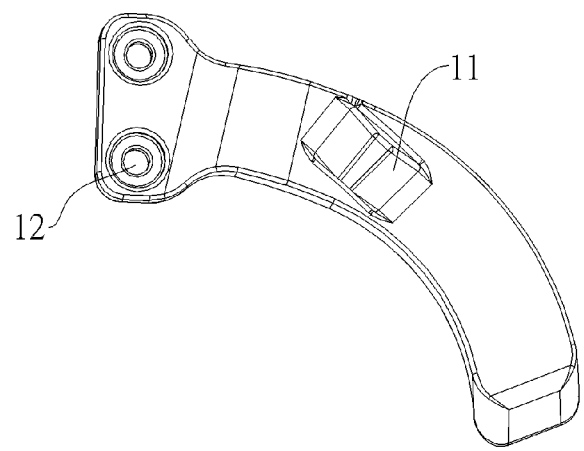
FIG. 8 is a diagram of a trigger according to the embodiment of the present invention.

Please refer to FIG. 5 to FIG. 8. FIG. 5 and FIG. 6 are partial diagrams of the child carrier 100 at different states according to the embodiment of the present invention. FIG. 7 is another partial diagram of the child carrier 100 according to the embodiment of the present invention. FIG. 8 is a diagram of the trigger 10 according to the embodiment of the present invention. As shown in FIG. 5 to FIG. 8, a triggering slanted surface 11 is disposed on the trigger 10. An abutting slanted surface 223 is disposed on the first abutting component 22. The triggering slanted surface 11 is for slidably abutting against the abutting slanted surface 223. Specifically, the trigger 10 further includes a fixing portion 12. The trigger 10 is installed on the frame 40 by the fixing portion 12, so that the trigger 10 can move along with a folding movement of the frame 40. Therefore, the triggering slanted surface 11 can slidably abut against the abutting slanted surface 223 when the frame 40 is being folded.

Besides, as shown in FIG. 8, specifically, in this embodiment, the trigger 10 can be an arc-shaped structure, so that the trigger 10 can continuously slidably abut against the abutting slanted surface 223 when the frame 40 is being folded. The triggering slanted surface 11 can be a concave slanted surface. The abutting slanted surface 223 can be a convex slanted surface. When the frame 40 is in an unfolded state, the abutting slanted surface 223 is located inside the triggering slanted surface 11. When the frame 40 is being folded, the trigger 10 moves along with the folding movement of the frame 40 to slidably abut against the abutting slanted surface 223 by the triggering slanted surface 11, so that the releasing mechanism 20 is driven to release the backrest 30. However, the present invention is not limited to this embodiment. For example, in another embodiment, it is not necessary to configure the trigger to continuously slidably abut against the abutting slanted surface when the frame is being folded, and the triggering slanted surface and the abutting slanted surface can be a convex slanted surface and a concave slanted surface respectively, or be two convex slanted surfaces. In other words, any mechanism which allows the triggering slanted surface to slidably abut against the abutting slanted surface for driving the releasing mechanism to release the backrest when the frame is being folded, is included within the scope of the present invention.

Figure 9:
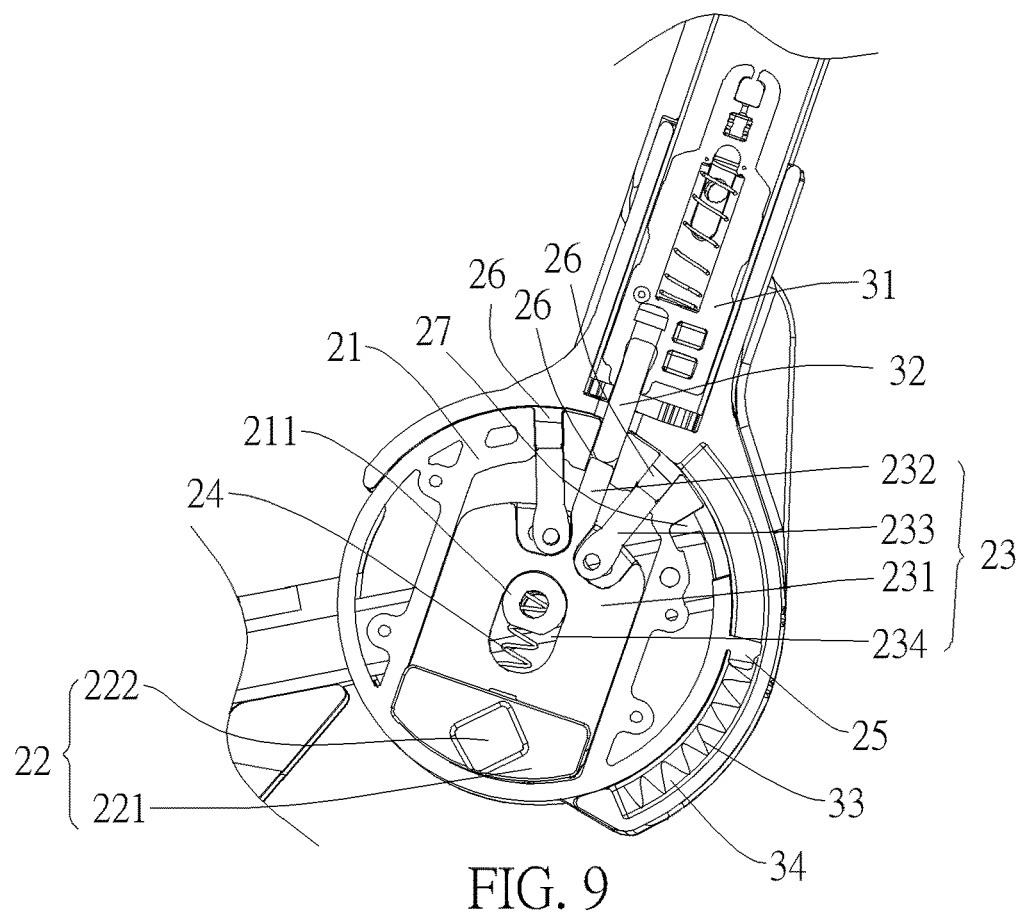
FIG. 9 is an internal structural diagram of a releasing mechanism in a locking state according to the embodiment of the present invention.
Figure 10:
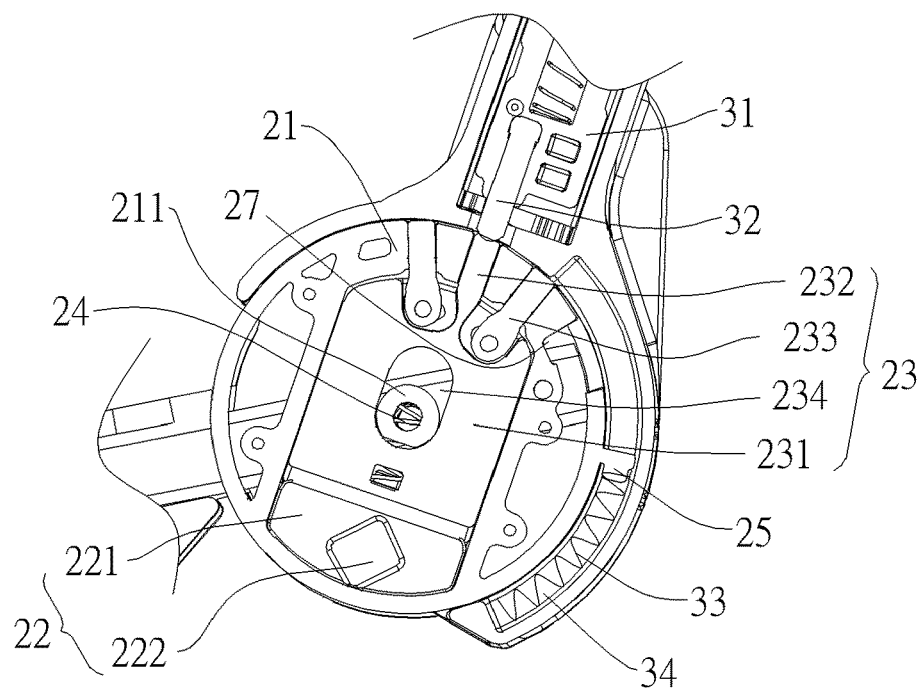
FIG. 10 is an internal structural diagram of the releasing mechanism in a releasing state according to the embodiment of the present invention.

Please refer to FIG. 7, FIG. 9 and FIG. 10. FIG. 9 is an internal structural diagram of the releasing mechanism 20 in a locking state according to the embodiment of the present invention. FIG. 10 is an internal structural diagram of the releasing mechanism 20 in a releasing state according to the embodiment of the present invention. As shown in FIG. 7, FIG. 9 and FIG. 10, a first connecting base 31 is disposed on an end portion of the backrest 30. The releasing mechanism 20 further includes a second connecting base 21 and a second abutting component 23. The second connecting base 21 is connected to the frame 40. The first connecting base 31 is rotatably connected to the second connecting base 21. A positioning component 32 is disposed on the first connecting base 31. Three positioning holes 26 are disposed on the second connecting base 21 and for allowing an insertion of the positioning component 32. The backrest 30 can be positioned at different angles when the positioning component 32 is inserted into different ones of the three positioning holes 26. The first abutting component 22 and the second abutting component 23 are slidably disposed on the second connecting base 21. An end of the first abutting component 22 slidably abuts against the second abutting component 23. When the trigger 10 slidably abuts against the first abutting component 22, the trigger 10 drives the first abutting component 22 to push the second abutting component 23 to disengage the positioning component 32 from the corresponding positioning hole 26. In this embodiment, the releasing mechanism 20 is driven to release the backrest 30 by a cooperation of the first abutting component 22 and the second abutting component 23 and a cooperation of the second abutting component 23 and the positioning component 32 to. However, the present invention is not limited to this embodiment. Any mechanism which allows the releasing mechanism to release the backrest when the frame is being folded, is included within the scope of the present invention.

Specifically, an installation assembly is disposed inside the first connecting base 31. The installation assembly is connected to the positioning component 32, so that the positioning component 32 can be driven by the installation assembly to be inserted into the corresponding positioning hole 26. In this embodiment, the positioning component 32 can be a positioning pin. When the trigger 10 slidably abuts against the first abutting component 22, the first abutting component 22 can push the second abutting component 23, so that the positioning component 32 can be driven by the second abutting component 23 to disengage from the corresponding positioning hole 26 for releasing the backrest 30. Understandably, during the aforementioned process, an acting force applied on the positioning component 32 and provided by the second abutting component 23 is greater than an acting force applied on the positioning component 32 and provided by the installation assembly.

As shown in FIG. 7, FIG. 9 and FIG. 10, the first abutting component 22 includes a first movable portion 221 and an abutting portion 222. The first movable portion 221 is for pushing the second abutting component 23. The abutting portion 222 protrudes out of the second connecting base 21 and is for slidably abutting against the trigger 10, i.e., the abutting slanted surface 223 is disposed on the abutting portion 222. In this embodiment, the abutting portion 222 protrudes out of the second connecting base 21 to slidably abut against the trigger 10. However, the present invention is not limited to this embodiment. In another embodiment, the trigger 10 can be configured to stretch into the second connecting base to slidably against the abutting portion.

Figure 11:
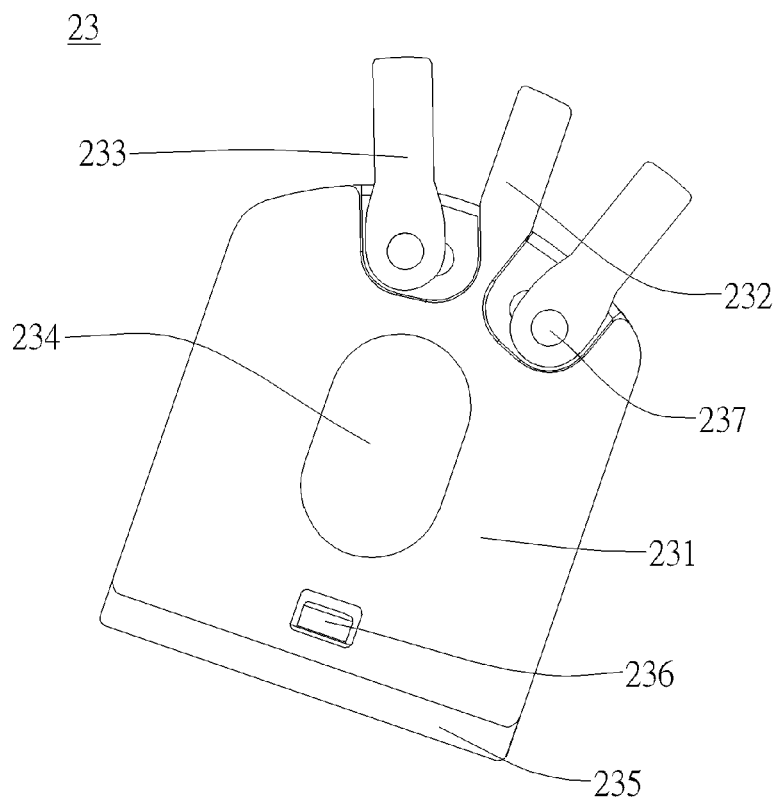
FIG. 11 is a diagram of a second abutting component according to the embodiment of the present invention.

Please refer to FIG. 9 to FIG. 11. FIG. 11 is a diagram of the second abutting component 23 according to the embodiment of the present invention. As shown in FIG. 9 to FIG. 11, the second abutting component 23 includes a second movable portion 231 and a first abutting pin 232. The second movable portion 231 is slidably disposed on the second connecting base 21. The first abutting pin 232 is disposed on the second movable portion 231 and is for being slidably inserted into the corresponding positioning hole 26. Furthermore, a guiding slot 234 is disposed on the second movable portion 231. A guiding component 211 is disposed on the second connecting base 21. The guiding component 211 slidably passes through the guiding slot 234. The second movable portion 231 is driven by a sliding cooperation of the guiding component 211 and the guiding slot 234 to slide relative to the second connecting base 21 along a longitudinal direction of the guiding slot 234, and a travel distance of a sliding movement of the second movable portion 231 is also limited by the sliding cooperation of the guiding component 211 and the guiding slot 234.

Specifically, a periphery of the second connecting base 21 is an arc-shaped structure. The three positioning holes 26 are disposed on the periphery of the second connecting base 21. The first abutting pin 232 can be integrally formed with the second movable portion 231 or be installed on the second movable portion 231 by a fastening component, such as a screwing member or a riveting member. Besides, the second abutting component 23 further includes two second abutting pins 233 pivoted to the second movable portion 231 and located at two sides of the first abutting pin 232. The first abutting pin 232 and the two second abutting pins 233 can be inserted into the corresponding positioning holes 26 respectively, so that the positioning component 32 can be driven by the first abutting pin 232 or the second abutting pin 233 to disengage from the corresponding positioning hole 26. In addition, since the periphery of the second connecting base 21 is the arc-shaped structure, a predetermined range of a swinging movement of each of the second abutting pins 233 is required when each of the second abutting pins 233 slides within the corresponding positioning hole 26. Therefore, each of the second abutting pins 233 is pivoted to the second movable portion 231 by a second installation portion 237, so that each of the second abutting pins 233 can pivot relative to the second movable portion 231 about the second installation portion 237, which enables each of the second abutting pins 233 to slide within the corresponding positioning hole 26 smoothly.

In this embodiment, a restraining hole 27 is further disposed on the second connecting base 21 and located adjacent to an end of a row of the positioning holes 26. The restraining hole 27 is for the positioning component 32 to be inserted therein to position the backrest 30 at a folded position when the backrest 30 is located at the folded position. In this embodiment, the folded position can be a horizontal position. It should be noticed that, different from the positioning hole 26, it is not necessary to configure the first abutting pin 232 or the second abutting pin 233 to be inserted into the restraining hole 27.

However, the present invention is not limited to this embodiment. In another embodiment, there can be only two positioning holes disposed on the second connecting base, and the second abutting component can include only one second abutting pin located at one side of the first abutting pin. Alternatively, in another embodiment, there can be only one positioning hole disposed on the second connecting base, and there can be no second abutting pin.

As shown in FIG. 9 and FIG. 10, a recovering component 24 is disposed between the second abutting component 23 and the second connecting base 21 and for driving the second abutting component 23 to recover. A first installation portion 236 is disposed on the second movable portion 231. An end of the recovering component 24 is fixed on the first installation portion 236, and another end of the recovering component 24 is fixed on the guiding component 211. The recovering component 24 can be a compression spring. When the first abutting component 22 is driven by the trigger 10 to push the second abutting component 23, the second movable portion 231 can slide relative to the second connecting base 21, so that the positioning component 32 can be pushed by the first abutting pin 232 or the second abutting pin 233 to disengage from the corresponding positioning hole 26, and the recovering component 24 can be resiliently deformed. The resiliently deformed recovering component 24 can recover the second abutting component 23, so that the first abutting pin 232 and the second abutting pins 233 are recovered for the positioning component 32 to be inserted into the corresponding positioning hole 26.

Figure 12:
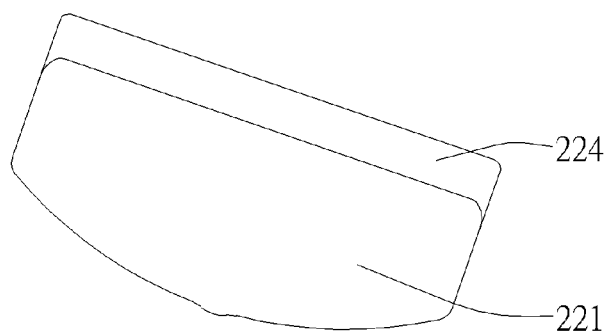
FIG. 12 is a diagram of a first abutting component according to the embodiment of the present invention.

Please refer to FIG. 0.11 and FIG. 12. FIG. 12 is a diagram of the first abutting component 22 according to the embodiment of the present invention. As shown in FIG. 11 and FIG. 12, a first slanted surface 224 is disposed on the first abutting component 22. A second slanted surface 235 is disposed on the second abutting component 23. The first slanted surface 224 is for slidably cooperating with the second slanted surface 235. When the abutting portion 222 is driven by the trigger 10 to move along a first direction, i.e., a direction that the abutting portion 222 moves toward an interior of the second connecting base 21, a sliding cooperation of the first slanted surface 224 and the second slanted surface 235 can change a force transmission direction, so that the second abutting component 23 can be pushed along a second direction different from the first direction by the first abutting component 22.

As shown in FIG. 9 and FIG. 10, a resilient component 33 is disposed between the backrest 30 and the frame 40 and for driving the backrest 30 to pivot to the folded position. Specifically, an accommodating slot 34 is disposed on the first connecting base 31. An engaging portion 25 is disposed on the second connecting base 21. A first end of the resilient component 33 is fixed on the engaging portion 25, and a second end of the resilient component 33 abuts against a wall of the accommodating slot 34. When the second connecting base 21 rotates relative to the first connecting base 31, the resilient component 33 can be compressed or released accordingly. Preferably, in this embodiment, the engaging portion 25 can be an engaging block. The resilient component 33 can be a spring structure. However, the present invention is not limited to this embodiment. For example, in another embodiment, the engaging portion can be an engaging notch for accommodating the first end of the resilient component. Alternatively, in another embodiment, the resilient component can be a torsional spring structure or a leaf spring structure.

Operation of the present invention is described as follows. When the frame 40 is being folded, the trigger 10 can move along with the folding movement of the frame 40, so that the abutting portion 222 can be driven to move toward the interior of the second connecting base 21 by the triggering slanted surface 11 and the abutting slanted surface 223 slidably abutting against each other. When the abutting portion 222 moves toward the interior of the second connecting base 21, the first movable portion 221 can be driven to push the second movable portion 231 to slide along the longitudinal direction of the guiding slot 234 by the first slanted surface 224 and the second slanted surface 235 slidably cooperating with each other, so that the first abutting pin 232 and each of the second abutting pins 233 can be inserted into the corresponding positioning holes 26 respectively, and the positioning component 32, which is inserted into one of the positioning holes 26, can be driven by the first abutting pin 232 or the second abutting pin 233 to disengage from the corresponding positioning hole 26 for releasing the backrest 30 to allow the backrest 30 to fold relative to the frame 40. After the backrest 30 is released, the user can fold the backrest 30 together with the frame 40.

In contrast to the prior art, the foldable backrest structure of the present application utilizes the releasing mechanism disposed between the backrest and the frame and the trigger disposed on the frame to release the backrest by a cooperation of the releasing mechanism and the trigger when the frame is being folded, so that a user can fold the backrest together with the frame. Therefore, the present invention has an advantage of easy operation. Besides, the present invention further has advantages of simple structure and low manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A foldable backrest structure adapted for a frame of a child carrier, the foldable backrest structure comprising:
a backrest pivoted to the frame;
a releasing mechanism disposed between the backrest and the frame, the releasing mechanism comprising a first abutting component; and
a trigger disposed on the frame and for slidably abutting against the first abutting component to drive the releasing mechanism to release the backrest, so as to allow the backrest to be folded together with the frame when the frame is being folded;
wherein a first connecting base is disposed on an end portion of the backrest, the releasing mechanism further comprises a second connecting base and a second abutting component, the second connecting base is connected to the frame, the first connecting base is rotatably connected to the second connecting base, a positioning component is disposed on the first connecting base, at least one positioning hole is disposed on the second connecting base and for allowing an insertion of the positioning component, the first abutting component and the second abutting component are slidably disposed on the second connecting base, an end of the first abutting component slidably abuts against the second abutting component, and the trigger drives the first abutting component to push the second abutting component to disengage the positioning component from the at least one positioning hole when the trigger slidably abuts against the first abutting component.

2. The foldable backrest structure of claim 1, wherein a triggering slanted surface is disposed on the trigger, an abutting slanted surface is disposed on the first abutting component, and the triggering slanted surface is for slidably abutting against the abutting slanted surface.

3. The foldable backrest structure of claim 1, wherein the first abutting component comprises a first movable portion and an abutting portion, the first movable portion is for pushing the second abutting component, and the abutting portion protrudes out of the second connecting base and is for slidably abutting against the trigger.

4. The foldable backrest structure of claim 1, wherein the second abutting component comprises a second movable portion and a first abutting pin, the second movable portion is slidably disposed on the second connecting base, and the first abutting pin is disposed on the second movable portion and is for being slidably inserted into the at least one positioning hole.

5. The foldable backrest structure of claim 4, wherein the at least one positioning hole comprises a plurality of positioning holes, the second abutting component further comprises at least one second abutting pin pivoted to the second movable portion, and the first abutting pin and the at least one second abutting pin are for being inserted into at least two corresponding positioning holes of the plurality of positioning holes respectively.

6. The foldable backrest structure of claim 4, wherein a guiding slot is disposed on the second movable portion, a guiding component is disposed on the second connecting base, the guiding component slidably passes through the guiding slot, and the second movable portion is driven by a sliding cooperation of the guiding component and the guiding slot to slide relative to the second connecting base along a longitudinal direction of the guiding slot.

7. The foldable backrest structure of claim 1, wherein a first slanted surface is disposed on the first abutting component, a second slanted surface is disposed on the second abutting component, and the first slanted surface is for slidably cooperating with the second slanted surface.

8. The foldable backrest structure of claim 1, wherein a recovering component is disposed between the second abutting component and the second connecting base and for driving the second abutting component to recover.

9. The foldable backrest structure of claim 8, wherein the recovering component is a compression spring.

10. The foldable backrest structure of claim 1, wherein a resilient component is disposed between the backrest and the frame and for driving the backrest to pivot to a folded position.

11. The foldable backrest structure of claim 10, wherein an accommodating slot is disposed on the first connecting base, an engaging portion is disposed on the second connecting base, a first end of the resilient component is fixed on the engaging portion, and a second end of the resilient component abuts against a wall of the accommodating slot.

12. The foldable backrest structure of claim 10, wherein the resilient component is a spring structure.

13. A child carrier comprising a frame, and the foldable backrest structure of claim 1 connected to the frame.

* * * * *